3,830,937
BALANCED AMINO-ACID FEED COMPOSITION
FOR PRAWNS
Kunihiko Shigeno, Kazumi Kumada, Osamu Deshimaru, Takayuki Aramaki, Katsunobu Kuroki, and Kazuo Kitaue, Kagoshima, Japan, assignors to Kagoshima-Ken, Kagoshima-shi, Kagoshima-ken, Japan, a local autonomy of Japan
Filed Dec. 27, 1971, Ser. No. 212,539
Claims priority, application Japan, Jan. 11, 1971, 46/561
Int. Cl. A23k 1/10, 1/18
U.S. Cl. 426—2
2 Claims

ABSTRACT OF THE DISCLOSURE

A feed composition for prawns comprising at least two main compounding elements selected from the group consisting of animal products such as squids, whales, mysid shrimps and fishes or meals thereof, botanical products such as soya bean protein and gluten and cells of microorganisms such as petroleum yeasts, marine yeasts, leavens and active sludge, which is characterized in that the content of crude protein in an end product is at least 60% by weight and the content of conjugated amino acids therein is at least 46% by weight.

---

Figures 1, 2:
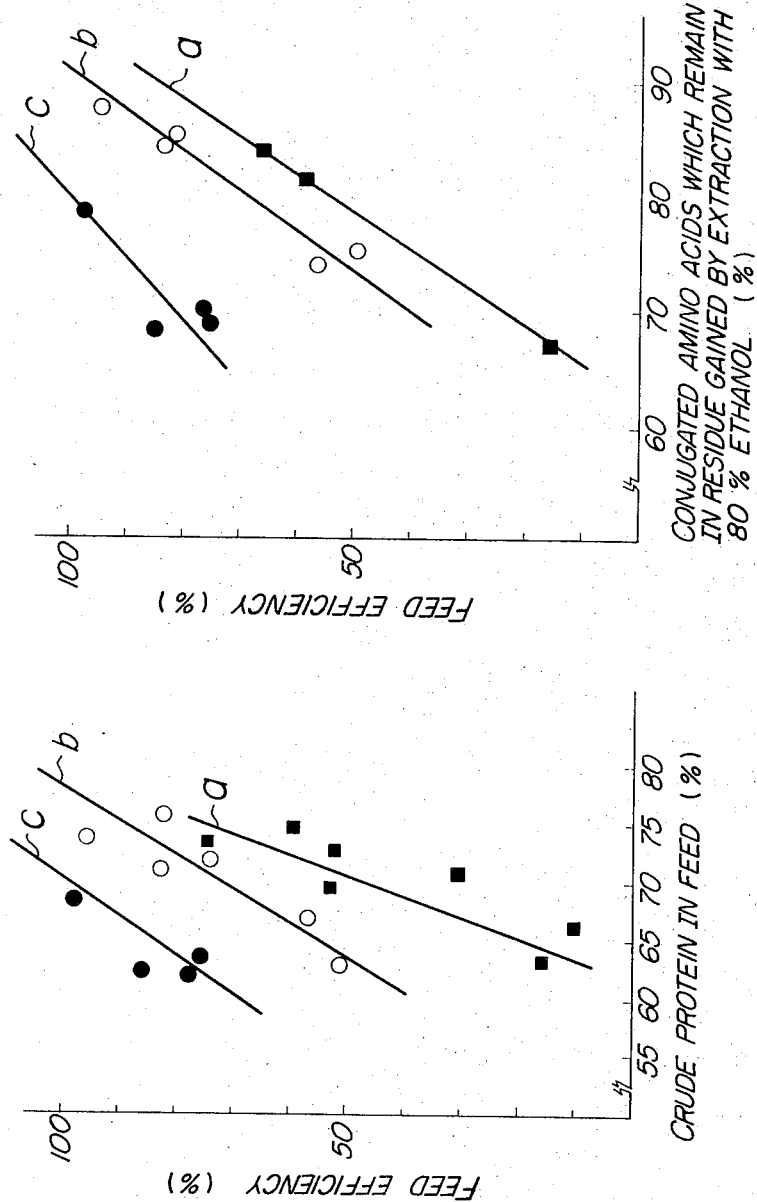

This invention relates to a feed composition for cultivating prawns and a method for cultivating prawns by using the same.

More particularly, this invention relates to a prawn-cultivating feed composition which comprises as main compounding elements animal products such as squid meal (in this specification, the term "squid meal" means dry powder obtained by grinding dried squid meat, and the term "meal" means dry powder obtained by grinding dried raw materials such as squid, whale meat and the like), botanical products such as gluten and the cells of microorganisms such as yeasts, and to a method for cultivating prawns by using the same.

Hitherto, fresh fishes and shellfishes such as, for example short necked claim, mussel, and the like have been used as feed for cultivating prawns, however, those are not ideal to feed prawns on a commercially large scale on account of their unsteady availability which owes to the fact that they themselves are marine live animals. Furthermore, they have drawbacks and expenses and labors are much required to transport and to store them without losing their freshness and also to prepare them before feeding.

If the culture of prawns becomes possible by using artificially prepared feed instead of conventional fresh fishes and shellfishes, a rapid progress of the culture technique can be expected since we can switch over from extensive culture with lower productivity to intensive culture with high productivity. There have been conducted various studies aiming at the development of an artificially prepared feed composition for prawns, however, all of them are still at a primary laboratory experiment stage and the subjects of studies are merely directed to compounds relating to ecdysis which occurs with the growth of prawns and to substances inducing the intake of feeds due to the specialty of prawns' fondness for the feed.

The above-mentioned fact is due to the obscurity of the physiology, ecology, nutrient requirements, environmental conditions suitable for cultivation and the like compared with those of fishes, and the fact shows the difficulty in developing an artificially prepared feed composition for prawns.

The present inventors have found, as a result of conducting various experiments, that a feed composition comprising, as main components, squid meal, squid extract and petroleum yeasts (in this specification, the term "petroleum yeasts" means cells of yeasts obtained by rearing yeasts in a medium containing hydrocarbons obtained from petroleum as a main carbon source, or protein extracted therefrom) has a predominant property as an artificial feed for prawns (see Japanese Patent Application No. 39,418/70). However, the above-mentioned feed composition is not always suitable for the culture of prawns on a commercial scale; because the cost of the composition becomes expensive because of the use of expensive squid extract in a considerably large quantity, and the supply of squid as a raw material for the extract varies depending upon the seasons.

Therefore, the present inventors have found, as a result of conducting further experiments, that a feed composition capable of cultivating prawns which have the same commercial value as natural ones without decreasing the feed efficiency (the feed efficiency is shown by the formula:

$$\left(\frac{\text{Increase in body weight (g.)}}{\text{Amount of intake feed (g.)}} \times 100\right)$$

can be obtained by compounding animal or botanical product used as an ordinary protein source so as to contain a given amount of crude protein and/or conjugated amino acids, or to contain a given amount of conjugated amino acids in which the eight respective specified amino acids among the constitutents are contained in the definite range.

The principal object of this invention is to provide a prawn-cultivating feed composition having a high feed efficiency and a capability of utilizing various kinds of materials which have hitherto been used as ordinary protein sources.

The further object of the invention is to provide a feed composition which can be produced with ease on an commercial scale.

These and the other objects of the invention will become apparent from the following description and claims.

As a result of conducting various experiments aiming at obtaining a feed composition suitable for cultivating prawns, the present inventors have found that the feed efficiency varies to a great extent, depending upon the content of crude protein (the content of crude protein is calculated by multiplying the amount of nitrogen determined by Kjeldahl's method by 6.25) in the feed or the content of conjugated amino acids therein, and a compounded feed containing crude protein and/or conjugated amino acids at a given level or more has a good feed efficiency. After repeated precise experiments, the present inventors have further found that the conjugated amino acids have the closest relationship with the growth of prawns; that a compounded feed should contain not only a large amount of conjugated amino acids therein, but also retain the respective amounts of eight amino acids consisting of aspartic acid, threonine, serine, valine, phenylalanine, lysine, histidine and arginine in said conjugated amino acids at a given level (hereinafter, the desirable ratios of the contents of the respective eight amino acids to the conjugated amino acid contents are referred to as "amino acid balance") and that any compounded feed which retains the amino acid balance has the same predominant feed efficiency as that of a compounded feed containing a given amount of crude protein and a given amount of conjugated amino acids. Especially, in the case of preparing a compounded feed based on the amino acid balance, any kind of ordinary protein source (hereinafter referred to as main compounding elements) can be used. That is, animal protein sources such as, for example, whale meal, fish meal (the fish meal has hitherto been considered to be not suitable for main compounding element) and the like in addition to squid meal, vegetable protein sources such as, for example, soya bean protein, gluten and the like, the cells of microorganisms such as, for example, yeasts and the like or protein extracted therefrom can be used.

The amino acid balance in a compounder feed is the fundamental problem in the preparation of compounded feeds, however, the amino acid balance of the compounded feed for Crustacea has been still uncertain.

On the contrary, according to the present invention, the amino acid balance of the compounded feed itself can be used as a fundamental ground in preparing it. In that case, any protein-containing material may be used as a raw material for the preparation of the feed. Thus, there is an advantage that any material selected optionally from many kinds of protein-containing materials can be employed since there is no limitation concerning the sort of protein-containing materials. For example, vegetable protein-containing materials which have seldom been used for the aquiculture feeds can be used very effectively.

FIG. 1 shows the relationship between the feed efficiency and the content of crude protein in the feeds in which the symbol "a" denotes the case where prawns having the average body weight of 1 gram grew up to ones having the average body weight of 2.4 grams after 25 day breeding, the symbol "b" denotes the case where prawns having the average body weight of 1.7 grams grew up to ones having the average body weight of 7.0 grams after 50 days breeding and the symbol "c" denotes the case where prawns having the average body weight of 7.2 grams grew up to ones having an average body weight of 9.0 grams after 30 day breeding.

FIG. 2 shows the relationship between the feed efficiency and the content of conjugated amino acids in the feed in which the symbols "a," "b" and "c" are as mentioned above.

The above-mentioned are fully illustrated by referring to the experiments.

There were employed in the following experiments cylindrical- or square pillar-like shape of feeds; because a cylindrical- or square pillar-like shape, as disclosed in Japanese Patent Application No. 77,806/69, was suitable for prawn feeds. As main compounding elements, there were used twelve kinds of protein-containing materials, namely, squid meal, petroleum yeasts, marine yeasts (the term marine yeasts" in this specification means cells which are obtained by collecting *Saccharomyces marinus* from sea-water, prerearing the seed yeast under a sterilized condition in a highly nutrient natural medium, rearing densely the said seed yeast aerobically in a medium prepared by dissolving nutrient sources such as nitrogen sources, vitamins and the like in sea-water and adjusting pH value of the solution to 5.5, separating cells of yeasts by centrifuge, washing twice the obtained cells with sea-water, subjecting the resulting cells to centrifuge, and drying them), leavens, mysid shrimp meal, sperm whale meal, finback meal, soya bean protein, gluten, active sludge, fish meal, brine shrimps (a sort of shrimps), as main compounding elements. The cultivation was conducted in a 100 to 1,000 ton water tank of concrete. Sea-water used as culture water was made to flow by using a pump. The culture period was at least one month, and the water temperature was kept at 20° to 28° C.

EXPERIMENTAL EXAMPLE 1

(Relationship between nitrogen component and feed efficiency)

17 kinds of compounded solid feeds were prepared by compounding said 12 materials so as to contain crude protein in a range of 60 to 75%.

Three groups of prawns which had the average body weights of 1.0, 1.7 and 7.2 grams respectively were reared for 25, 50 and 30 days, respectively by using about 12,000 prawns per plot and the respective average body weight thereof became 2.4 g., 7.0 g. and 9.0 g.

The feed efficiency, the content of crude protein and the content of conjugated amino acids of 17 feed compositions were shown in Table 1. The results are also shown in FIGS. 1 and 2.

TABLE 1

| Plot | No. of feed | Feed efficiency (percent) | Crude protein in the feeds (percent) | Conjugated amino acids which remain in residue gained by extraction by 80% ethanol (percent) |
|---|---|---|---|---|
| □ | 1 | 74.6 | 73.3 | |
| │ | 2 | 67.0 | | 84.0 |
| │ | 3 | 60.0 | 74.7 | 81.5 |
| □ | 4 | 52.5 | 69.5 | |
| | 5 | 52.2 | 72.5 | |
| Breeding for 25 days | 6 | 30.0 | 70.9 | |
| | 7 | 15.4 | 63.3 | 67.1 |
| | 8 | 9.9 | 66.3 | |
| ○ | 1 | 96.2 | 73.6 | 88.1 |
| │ | 2 | 83.0 | 71.4 | 84.8 |
| ○ | 3 | 82.6 | 76.2 | 85.9 |
| Breeding for 50 days | 4 | 74.6 | 72.3 | |
| | 5 | 57.0 | 66.7 | 74.9 |
| | 6 | 50.4 | 63.3. | 75.3 |
| ● | 1 | 98.0 | 69.0 | 79.0 |
| │ | 2 | 86.2 | 62.6 | 69.1 |
| ● | 3 | 77.5 | 62.7 | 70.5 |
| Breeding for 30 days | 4 | 76.3 | 62.7 | 69.6 |

As is clear from FIGS. 1 and 2, there was observed the correlation between the feed efficiency and the content of crude protein or the feed efficiency and the content of conjugated amino acids. In other words, it is clearly understood that a compounded feed having a high feed efficiency should be that having a high content of crude protein or a high content of conjugated amino acids.

As a result of conducting various experiments based on the above-mentioned basic findings, the present inventors have found that a high feed efficiency and a good growth can be attained by using squid meal as a main protein source and adding cells of microorganisms such as petroleum and marine yeasts thereto within a limit of 30% by weight. The present inventors have also found that at least 60% by weight of crude protein and/or at least 50% by weight of conjugated amino acids should be contained in an end product as a nitrogen source.

EXPERIMENTAL EXAMPLE 2

(Relationship among feed efficiency, contents of conjugated amino acids and respective amino acids constituting them)

The inventors made clear in Experimental Example 1 that a high content of conjugated amino acids is the necessary conditions when wanted a high feed efficiency. In order to clarify the relationship between them, the inventors reared prawns for two months using compounded feeds containing 71%, 63%, 60% and 58% by weight of crude protein therein, respectively by compounding the previously said protein-containing materials.

The feed efficiency based on the results of rearing and the content of conjugated amino acids are comparatively shown in Table 2.

TABLE 2

Comparison between feed efficiency and content of conjugated amino acids

| | Feed | | | |
|---|---|---|---|---|
| Item | 1 | 2 | 3 | 4 |
| Content of crude protein in feed, percent | 71 | 63 | 60 | 58 |
| Content of conjugated amino acids in a residue when the feeds were extracted by 80% ethanol, percent | 83 | 80 | 74 | 74 |
| Feed efficiency, percent | (a) | 90–80 | 80–60 | (b) | a 90% or more.  b 60% or less.

The results shown in Table 2 clearly show that a feed composition having a high feed efficiency is high in the content of crude protein and the content of conjugated amino acids, as previously confirmed in Experimental Example 1, however, there was observed a significant difference in the feed efficiency between Feed 3 and Feed 4 while the contents of conjugated amino acids of Feed 3 and Feed 4 were both 74%. And the feed efficiency of Feed 4 was relatively low and less than 60%. Considering that not only the quantitative matters concerning crude protein or conjugated amino acids but also the qualitative matters of feed components such as, for example, the quantity of each amino acid constituting conjugated amino acids or the ratio of the quantity of each amino acid to that of conjugated amino acid (this ratio is hereinafter referred to as "distribution ratio" and the distribution ratio of each amino acid is given by the formula, $$\frac{\text{Amount of the conjugated amino acid}}{\text{Total amount of conjugated amino acids} + \text{ammonia}} \times 100$$

should be an important factor, the present inventors assayed Feeds 1 to 4. The results are shown in Table 3.

The term "conjugated amino acids" means 17 amino acids consisting of aspartic acid, threonine, serine, glutamic acid, proline, glycine, alanine, cystine, valine, methionine, isoleucine, leucine, tyrosine, phenylalanine, lysine, histidine and arginine which are detected by a liquid chromatography from hydrolyzate obtained by extracting the feed composition with 80% ethyl alcohol by heating moderately, removing the extract to obtain residue and hydrolyzing the residue with 6N HCl solution in a sealed tube under reduced pressure at 110° C. for 24 hours. Accordingly, the term "the content of conjugated amino acids" means the total of the contents of the respective above-mentioned 17 amino acids and the term "the distribution ratio of amino acid" means the ratio calculated by dividing the quantity of the amino acid by the content of 18 components (17 conjugated amino acid and ammonia) and multiplying the quotient by 100 as shown previously.

4 which has a feed efficiency of 60% or less. That is, Feed 4 having a low feed efficiency is high in the distribution ratios of neutral and acidic amino acids, such as aspartic acid, threonine, glutamic acid and valine and is low in those of basic amino acids such as lysine, histidine and arginine, and that of phenylalanine, as compared with Feeds 1 to 3 having high feed efficiencies. Thus, it is concluded that there is a distinct difference in the amino acid balance.

The present inventors have found, as a result of conducting a large number of experiments in order to clarify the feed components capable of increasing the feed efficiency, that the unbalance in the distribution ratios of respective conjugated amino acids contained in the feed, namely, the unbalance in the amino acid balance will result in the decrease in the feed efficiency and have also known, from the above-mentioned matters, that the inferiority in the feed efficiency of Feed 4, although Feed 4 being the same in the content of conjugated amino acid as Feed 3, was due to the unbalance of the amino acid balance.

Generally, the relative quantitative ratio of amino acids in compounded feeds, that is, the optimum amino acid balance varies depending upon kinds of objective animals, and that for prawns has not yet been clear.

The present inventors have found from the results of numerous experiments including the above-mentioned experiments, that it is an essential condition that a feed having a good feed efficiency of prawns should have a proper distribution ratio as to 8 amino acids consisting of aspartic acid, threonine, serine, valine, phenylalanine, lysine, histidine and arginine among said 18 components, that is, the feed having a good feed efficiency should retain the amino acid balance, and also found that the respective optimum distribution ratios of amino acids should be in the range shown in Table 4.

TABLE 4

| Amino: | Optimum distribution ratio (percent) |
|---|---|
| Aspartic acid | 10.6–12.0 |
| Threonine | 4.3–5.7 |
| Serine | 3.8–5.4 |
| Valine | 4.0–5.4 |
| Phenylalanine | 3.9–5.5 |
| Lysine | 6.7–9.1 |
| Histidine | 1.5–2.5 |
| Arginine | 6.1–8.1 |

TABLE 3
Content of conjugated amino acids and distribution ratio thereof

| Feed | 1 | | 2 | | 3 | | 4 | |
|---|---|---|---|---|---|---|---|---|
| Feed efficiency | 90% or more | | 90–80% | | 80–60% | | 60% or less | |
| Amino acid | Content of amino acid (g. percent) | Distribution ratio (percent) | Content of amino acid (g. percent) | Distribution ratio (percent) | Content of amino acid (g. percent) | Distribution ratio (percent) | Content of amino acid (g. percent) | Distribution ratio (percent) |
| Aspartic acid | 9.52 | 11.4 | 8.95 | 11.2 | 8.44 | 11.3 | 10.46 | 14.0 |
| Threonine | 4.26 | 5.1 | 4.07 | 5.1 | 3.66 | 4.9 | 4.41 | 5.9 |
| Serine | 4.17 | 5.0 | 3.91 | 4.9 | 3.58 | 4.8 | 4.18 | 5.6 |
| Glutamic acid | 13.79 | 16.5 | 13.11 | 16.4 | 12.10 | 16.2 | 13.30 | 17.8 |
| Proline | 3.67 | 4.4 | 3.60 | 4.5 | 3.06 | 4.1 | 3.51 | 4.7 |
| Glycine | 4.59 | 5.5 | 4.55 | 5.7 | 3.81 | 5.1 | 4.41 | 5.9 |
| Alanine | 4.84 | 5.8 | 4.47 | 5.6 | 4.11 | 5.5 | 4.56 | 6.1 |
| Cystine | 0.58 | 0.7 | 0.80 | 1.0 | 0.82 | 1.1 | 0.52 | 0.7 |
| Valine | 4.09 | 4.9 | 4.07 | 5.1 | 3.58 | 4.8 | 4.11 | 5.5 |
| Methionine | 1.67 | 2.0 | 0.96 | 1.2 | 2.02 | 2.7 | 0.75 | 1.0 |
| Isoleucine | 4.26 | 5.1 | 4.23 | 5.3 | 3.66 | 4.9 | 4.11 | 5.5 |
| Leucine | 6.60 | 7.9 | 7.19 | 9.0 | 5.97 | 8.0 | 6.42 | 8.6 |
| Tyrosine | 3.17 | 3.8 | 3.12 | 3.9 | 2.84 | 3.8 | 2.61 | 3.5 |
| Phenylalanine | 3.84 | 4.6 | 3.51 | 4.4 | 3.37 | 4.5 | 2.69 | 3.6 |
| Lysine | 6.18 | 7.4 | 5.59 | 7.0 | 5.90 | 7.9 | 4.71 | 6.3 |
| Histidine | 1.59 | 1.9 | 1.52 | 1.9 | 1.57 | 2.1 | 0.75 | 1.0 |
| Ammonia | 1.08 | 1.3 | 1.12 | 1.4 | 1.04 | 1.4 | 0.37 | 0.5 |
| Arginine | 5.76 | 6.9 | 5.19 | 6.5 | 5.23 | 7.0 | 2.84 | 3.8 |
| Total | 83.66 | 100 | 79.96 | 100 | 74.76 | 100 | 74.71 | 100 |

When compared the distribution ratio of each amino acid of respective Feeds 1 to 4 in Table 3 in view of the feed efficiency, there is observed a distinct difference in the distribution ratios of amino acids between Feeds 1 to 3 which have the feed efficiency of 60% or more and Feed 4 which has a feed efficiency of 60% or less. That is, Feed Preferably, the content of conjugated amino acids as the total content of 18 amino acids including ammonia is in the range of 46% to 60% by weight in an end product, and the amino acid balance should fall within the range shown in Table 4 above.

EXPERIMENTAL EXAMPLE 3

(Illustrative Examples of the present compounded feed based on the amino acid balance and breeding results using the same)

As previously stated, the present inventors have found that it is an essential condition that a feed capable of growing prawns efficiency should be rich in both the content of crude protein and that of conjugated amino acids, the feed efficiency decreases in case where the distribution ratios of respective amino acids, namely, the amino acid balance are unbalanced even if the content of conjugated amino acids were at a given level and found the fact that the optimum amino acid balance of a prawn feed which had not been clear should be as shown in Table 4.

The fact mentioned above is a fundamental requirement for preparing a compounded feed of prawns. Thus, the present compounded feed based on the above-mentioned findings may be any compounded feed prepared by mixing given amounts of proper protein-containing materials, if necessary, will admixing additives such as, for example, vitamin preparations based on Halver composition a mixture of inorganic salts (a mixture of sodium, potassium and calcium phosphates and calcium acetate or calcium lactate which calcium-phosphorus ratio is 2-3 to 1), a coloring agent such as β-carotene, a binding agent, a medicament and the like, provided that the conjugated amino acid content thereof in an end product is in the range of 46% to 60% by weight and the distribution ratios of respective amino acids consisting of aspartic acid, threonine, serine, valine, phenylalanine, lysine, histidine and arginine are in the range shown in Table 4. Accordingly, there is no limitation concerning main compounding elements if based on the amino acid balance and any material containing protein may be used as main compounding elements. Generally, the content of conjugated amino acids and the distribution ratios of respective amino acids in each protein-containing material may vary, depending upon the kind of the protein-containing material.

Table 5 shows the content of conjugated amino acids and the distribution ratios of respective amino acids in 12 raw material used in the experiments.

TABLE 5

Contents of conjugated amino acids and distribution ratios thereof

| Main compounding element | Index of conjugated amino acids [1] | Content of amino acid and distribution ratio | Aspartic acid | Threonine | Serine | Glutamic acid | Proline | Glycine | Alanine | Cystine | Valine | Methionine | Isoleucine | Leucine | Tyrosine | Phenylalanine | Lysine | Histidine | Ammonia | Arginine | Total (g. percent) |
|---|---|---|---|---|---|---|---|---|---|---|---|---|---|---|---|---|---|---|---|---|---|
| Squid meal | 0.75 | Content of amino acid, g. percent | 12.1 | 5.1 | 4.7 | 16.0 | 3.8 | 4.9 | 5.0 | 0.7 | 4.3 | 2.8 | 4.8 | 6.6 | 3.8 | 5.5 | 8.0 | 2.0 | 1.1 | 7.1 | 99.3 |
|  |  | Distribution ratio, percent | 12.1 | 5.1 | 4.8 | 16.1 | 3.8 | 5.0 | 5.0 | 0.7 | 4.4 | 2.9 | 4.9 | 6.7 | 3.8 | 5.6 | 8.0 | 2.0 | 1.1 | 7.2 |  |
| Petroleum yeasts | 0.52 | Content of amino acid, g. percent | 7.8 | 3.7 | 3.4 | 8.0 | 3.0 | 3.6 | 4.6 | 0.3 | 4.4 | 1.1 | 3.8 | 5.8 | 2.6 | 3.3 | 6.4 | 1.7 | 1.3 | 3.8 | 69.2 |
|  |  | Distribution ratio, percent | 11.2 | 5.4 | 4.9 | 12.4 | 4.4 | 5.2 | 6.7 | 0.5 | 6.3 | 1.7 | 5.5 | 8.4 | 3.8 | 4.8 | 9.2 | 2.5 | 2.9 | 5.5 |  |
| Marine yeasts | 0.19 | Content of amino acid, g. percent | 3.4 | 1.9 | 1.9 | 3.7 | 1.1 | 1.4 | 1.6 | Tr | 1.7 | 0.4 | 1.9 | 2.7 | 0.9 | 1.4 | 2.5 | 0.7 | 0.7 | 1.2 | 29.1 |
|  |  | Distribution ratio, percent | 11.8 | 6.7 | 6.5 | 12.7 | 3.7 | 4.9 | 5.6 |  | 5.8 | 1.4 | 6.6 | 9.3 | 3.0 | 4.7 | 8.6 | 2.3 | 2.3 | 4.2 |  |
| Leavens | 0.34 | Content of amino acid, g. percent | 4.7 | 2.8 | 2.7 | 6.1 | 2.1 | 2.2 | 2.8 | 0.9 | 3.4 | 0.9 | 2.7 | 4.0 | 1.7 | 2.3 | 4.3 | 1.1 | 0.8 | 2.6 | 46.3 |
|  |  | Distribution ratio, percent | 10.0 | 5.9 | 5.6 | 12.9 | 4.4 | 4.8 | 6.0 | 1.2 | 7.1 | 1.8 | 5.8 | 8.4 | 3.7 | 4.9 | 8.9 | 2.3 | 1.7 | 5.6 |  |
| Mysid shrimp meal | 0.55 | Content of amino acid, g. percent | 10.1 | 4.5 | 4.2 | 12.4 | 3.2 | 3.9 | 4.5 | 1.0 | 4.2 | 2.5 | 0.4 | 5.8 | 3.6 | 4.0 | 6.9 | 2.0 | 1.6 | 5.2 | 80.0 |
|  |  | Distribution ratio, percent | 12.6 | 5.6 | 5.3 | 15.6 | 4.0 | 4.9 | 5.7 | 1.2 | 5.3 | 3.1 | 0.5 | 7.3 | 4.5 | 5.0 | 8.6 | 2.5 | 2.0 | 6.8 |  |
| Spermwhale meal | 0.63 | Content of amino acid, g. percent | 7.1 | 3.8 | 3.5 | 12.0 | 5.5 | 6.1 | 5.4 | 0.3 | 4.9 | 1.6 | 3.2 | 7.6 | 3.3 | 4.4 | 6.6 | 3.0 | 0.7 | 5.0 | 84.0 |
|  |  | Distribution ratio, percent | 8.4 | 4.5 | 4.2 | 14.3 | 6.6 | 7.3 | 6.5 | 0.3 | 5.8 | 2.0 | 3.9 | 9.1 | 3.9 | 5.3 | 7.9 | 3.5 | 0.8 | 6.0 |  |
| Finback meal | 0.74 | Content of amino acid, g. percent | 8.1 | 4.4 | 3.8 | 13.2 | 4.6 | 5.4 | 5.9 | Tr | 4.8 | 2.4 | 4.6 | 8.2 | 3.8 | 4.5 | 7.1 | 7.4 | 0.8 | 5.6 | 88.6 |
|  |  | Distribution ratio, percent | 9.1 | 4.9 | 4.2 | 14.7 | 5.1 | 6.1 | 6.6 |  | 5.4 | 2.7 | 5.1 | 9.1 | 4.3 | 5.1 | 7.9 | 2.7 | 0.9 | 6.2 |  |
| Soya bean protein | 0.49 | Content of amino acid, g. percent | 7.8 | 2.7 | 3.6 | 13.3 | 3.5 | 2.9 | 2.9 | 0.9 | 2.8 | 0.9 | 3.2 | 5.1 | 2.3 | 3.5 | 4.2 | 1.7 | 1.2 | 5.0 | 67.5 |
|  |  | Distribution ratio, percent | 11.6 | 4.1 | 5.3 | 19.7 | 5.2 | 4.3 | 4.4 | 1.2 | 4.2 | 1.3 | 4.7 | 7.6 | 3.5 | 5.1 | 6.3 | 2.5 | 1.8 | 7.4 |  |
| Gluten | 0.32 | Content of amino acid, g. percent | 3.4 | 2.3 | 3.5 | 21.6 | 6.3 | 4.4 | 2.6 | 1.0 | 3.0 | 1.0 | 2.1 | 4.4 | 3.0 | 2.6 | 2.3 | 1.4 | 2.3 | 3.7 | 70.9 |
|  |  | Distribution ratio, percent | 4.8 | 3.3 | 4.9 | 30.4 | 8.9 | 6.2 | 3.6 | 1.4 | 4.2 | 1.4 | 3.0 | 6.2 | 4.2 | 3.7 | 3.3 | 2.0 | 3.2 | 5.3 |  |
| Active sludge | 0.34 | Content of amino acid, g. percent | 0.4 | 2.0 | 1.8 | 4.7 | 2.0 | 2.0 | 2.4 | Tr | 2.4 | 1.0 | 2.1 | 3.1 | 1.4 | 2.4 | 2.2 | 0.9 | 0.7 | 2.2 | 33.7 |
|  |  | Distribution ratio, percent | 11.6 | 5.3 | 4.7 | 12.6 | 5.2 | 5.3 | 6.5 |  | 6.5 | 2.6 | 5.6 | 8.2 | 3.8 | 6.3 | 5.9 | 2.4 | 1.8 | 5.8 |  |
| Fish meal | 0.64 | Content of amino acid, g. percent | 8.2 | 3.6 | 3.8 | 12.0 | 3.8 | 5.0 | 4.9 | 0.8 | 3.5 | 2.5 | 3.6 | 6.1 | 2.9 | 3.2 | 5.7 | 1.3 | 0.9 | 4.7 | 76.5 |
|  |  | Distribution ratio, percent | 10.8 | 4.7 | 4.9 | 15.7 | 4.9 | 6.6 | 6.4 | 1.0 | 4.6 | 3.3 | 4.7 | 7.9 | 3.8 | 4.2 | 7.5 | 1.7 | 1.2 | 6.1 |  |
| Brine shrimp meal | 0.34 | Content of amino acid, g. percent | 6.5 | 3.1 | 3.3 | 9.3 | 3.0 | 3.1 | 3.3 | 0.8 | 3.4 | 1.5 | 3.2 | 5.5 | 2.9 | 3.4 | 4.8 | 1.4 | 1.1 | 4.3 | 63.9 |
|  |  | Distribution ratio, percent | 10.1 | 4.9 | 5.2 | 14.6 | 4.7 | 4.9 | 5.2 | 1.3 | 5.3 | 2.3 | 5.1 | 8.6 | 4.6 | 5.3 | 7.4 | 2.2 | 1.7 | 6.8 |  |

[1] Index of conjugated amino acid = [Amount of residue after removing extract from feed with a 80% alcohol (percent)] × [Content of amino acid in residue (percent)] / 10,000

As shown in Table 5, the content of conjugated amino acids and the distribution ratios of respective amino acids vary depending upon the kind of main compounding elements. For example, the content of conjugated amino acids of squid meal is 99% by weight while that of marine yeasts is 29%.

Accordingly, the optimum amino acid balance cannot be attained by using single compounding element, and the combination of at least two main compounding elements is necessary for retaining the optimum amino acid balance disclosed by the present inventors to obtain a compounded feed having a high feed efficiency.

An illustrative example of the present compounded feed having around 50% by weight of conjugated amino acids and the distribution ratios of respective amino acids in the end product in which squid meal, mysid shrimp meal, active sludge, finback meal, commercially available yeasts for compounded feeds, soya bean protein and gluten are used as main compounding elements, is shown in Table 6.

Firstly, the amounts of respective main compounding elements to be used in the feed is determined in order that the total amount of the elements reaches 80–85 parts by weight (in this case, the additives are added so as to become 100 parts by weight in total). The content of conjugated amino acids in each element is given by multiplying the amount of each element to be used by the corresponding index of conjugated amino acids. When summed up the content of conjugated amino acids in respective elements, the total should be in the range of 46–60% by weight.

The amounts of respective compounding elements to be employed are calculated temporarily based on the analytical results of amino acid contents in respective elements and then the kind of compounding elements and the amouts thereof are determined finally so as to be retained an optimum amino acid balance in an end product based on the calculated distribution ratios of respective amino acids.

TABLE 6

An illustrative example of designing a compounded feed having around 50% by weight of conjugated amino acids in the end product in which squid meal, mysid shrimp meal, active sludge, finback meal, leavens, soya bean protein and gluten are used as main compounding elements

| Compounding element | Amount of element (percent) (A) | Index of conjugated amino acid (B) | Total conjugated aminoacid contents in said amount of element (g.) (C)[1] | Distribution ratio (D) and content (E)[2] of conjugated amino acid | Aspartic acid | Threonine | Serine | Glutamic acid | Proline | Glycine | Alanine | Cystine | Valine | Methionine | Isoleucine | Leucine | Tyrosine | Phenylalanine | sine | sine | Histidine | Ammonia | Arginine |
|---|---|---|---|---|---|---|---|---|---|---|---|---|---|---|---|---|---|---|---|---|---|---|---|
| Squid meal | 40 | 0.75 | 30.0 | Distribution ratio | 12.1 | 5.1 | 4.7 | 16.0 | 3.8 | 4.9 | 5.0 | 0.7 | 4.3 | 2.8 | 4.8 | 7.6 | 3.8 | 8.5 | 8.0 | | 2.0 | 1.1 | 7.1 |
| | | | | Content of conjugated amino acid | 3.64 | 1.53 | 1.43 | 4.84 | 1.14 | 1.59 | 1.51 | 0.21 | 1.31 | 0.86 | 1.45 | 1.30 | 1.14 | 1.67 | 2.14 | | 6.62 | 0.32 | 2.15 |
| Mysid shrimp meal | 3 | 0.55 | 1.7 | Distribution ratio | 12.6 | 5.6 | 5.3 | 15.6 | 4.0 | 4.9 | 5.7 | 1.2 | 5.3 | 3.1 | 0.5 | .73 | 4.5 | 5.0 | 8.6 | | 2.5 | 2.0 | 6.5 |
| | | | | Content of conjugated amino acid | 0.21 | 0.09 | 0.09 | 0.26 | 0.07 | 0.08 | 0.09 | 0.02 | 0.09 | 0.05 | 0.01 | 0.12 | 0.08 | 0.08 | 0.1 | | 0.04 | 0.03 | 0.11 |
| Active sludge | 3 | 0.34 | 1.0 | Distribution ratio | 11.6 | 5.3 | 4.7 | 12.6 | 5.2 | 5.3 | 6.5 | | 6.5 | 2.6 | 5.6 | 8.2 | 3.8 | 6.3 | 5.9 | | 2.4 | 1.8 | 5.8 |
| | | | | Content of conjugated amino acid | 0.12 | 0.05 | 0.05 | 0.13 | 0.05 | 0.05 | 0.07 | | 0.07 | 0.03 | 0.07 | 0.08 | 0.04 | 0.06 | 0.06 | | 0.02 | 0.02 | 0.06 |
| Finback meal | 15 | 0.74 | 11.1 | Distribution ratio | 9.1 | 4.9 | 4.2 | 14.7 | 5.1 | 6.1 | 6.6 | | 5.4 | 2.7 | .5 | 9.1 | 4.3 | 5.1 | 7.9 | | 2.7 | 0.9 | 6.2 |
| | | | | Content of conjugated amino acid | 1.00 | 0.55 | 0.47 | 1.65 | 0.57 | 0.68 | 0.74 | | 0.60 | 0.30 | 0.57 | 1.02 | 0.48 | 0.57 | 0.89 | | 0.30 | 0.10 | 0.70 |
| Leavens | 4 | 0.34 | 1.4 | Distribution ratio | 10.0 | 5.9 | 5.6 | 12.9 | 4.4 | 4.8 | 6.0 | | 7.1 | 1.8 | 5.8 | 8.4 | 3.7 | 4.9 | 8.9 | | 2.3 | 1.7 | 5.6 |
| | | | | Content of amino acid | 0.14 | 0.08 | 0.08 | 0.18 | 0.06 | 0.07 | 0.08 | | 0.10 | 0.02 | 0.08 | 0.12 | 0.05 | 0.07 | 0.12 | | 0.03 | 0.02 | 0.08 |
| Soya bean protein | 12 | 0.49 | 5.9 | Distribution ratio | 11.6 | 4.1 | 5.3 | 19.7 | 5.2 | 4.3 | 4.4 | 1.2 | 4.2 | 1.3 | 4.7 | 7.6 | 3.5 | 5.1 | 6.3 | | 2.5 | 1.8 | 7.4 |
| | | | | Content of amino acid | 0.68 | 0.24 | 0.31 | 1.15 | 0.31 | 0.25 | 0.26 | 0.07 | 0.25 | 0.08 | 0.28 | 0.45 | 0.21 | 0.30 | 0.37 | | 0.14 | 0.11 | 0.43 |
| Gluten | 3 | 0.32 | 1.0 | Distribution ratio | 4.8 | 3.3 | 4.9 | 30.4 | 8.9 | 6.2 | 3.6 | 1.4 | 4.2 | 1.4 | 3.0 | 6.2 | 4.2 | 3.7 | 3.3 | | 2.0 | 3.2 | 5.3 |
| | | | | Content of amino acid | 0.03 | 0.02 | 0.03 | 0.21 | 0.06 | 0.04 | 0.03 | 0.01 | 0.03 | 0.01 | 0.02 | 0.04 | 0.03 | 0.02 | 0.04 | | 0.01 | 0.02 | 0.04 |
| Total | 80 | | 52.1 | Content of amino acid | 5.82 | 2.56 | 2.46 | 8.42 | 2.25 | 2.66 | 2.78 | 0.24 | 2.45 | 1.35 | 2.49 | 4.13 | 2.03 | 2.77 | 4.03 | | 1.16 | 0.62 | 3.57 |
| | | | 100.0 | Distribution ratio | 11.2 | 4.9 | 4.7 | 16.6 | 4.4 | 5.1 | 5.4 | 0.5 | 4.7 | 2.6 | 4.8 | 8.0 | 3.9 | 5.3 | 7.8 | | 2.2 | 1.2 | 6. |

[1] (C) g. = (A)×(B).
[2] (E) g. = (D)×(C)/100.

In the above-mentioned illustrative Example according to this invention, 40% by weight of squid meal, 3% by weight of mysid shrimp meal, 3% by weight of active sludge, 15% by weight of finback meal, 4% by weight of leavens, 12% by weight of soya bean protein and 3% by weight of gluten were compounded to obtain a feed composition having 52% by weight of the total conjugated amino acid content. And the distribution ratios of respective amino acids consisting of aspartic acid, threonine, serine, valine, phenylalanine, lysine, histidine and arginine in the total conjugated acids content met the requirements concerning the optimum amino acid balance according to this invention, as shown in Table 6.

In this Example, the rearing was conducted for 2 months by feeding prawns having the initial average body weight of 1.2 g. with the feed composition obtained by adding the additives to the mixture illustrated in Table 6 and molding the resultant into a cylindrical shape. As a reference feed, there were used fresh short-necked clams as well as a feed composition having 48.54% by weight of the total conjugated amino acid content, but having 10% of aspartic acid, 4.9% of threonine, 4.6% of serine, 5.6% of valine, 5.1% of phenylalanine, 7.8% of lysine, 2.8% of histidine and 6.0% of arginine in the distribution ratios thereof respectively, and thus being deviated from the amino acid balance according to this invention in aspartic acid, valine, histidine and arginine.

The composition of the compounded feeds and the results of rearing are shown in Table 7 and Table 8, respectively.

TABLE 7
Compositions of feeds

| Material for compounding | Present feed | Reference feed | |
|---|---|---|---|
| | | Compounded feed | Fresh short-necked clams |
| Main compounding elements: | | | |
| Squid meal | 40 | 10 | |
| Mysid shrimp meal | 3 | 10 | |
| Petroleum yeasts | | 20 | |
| Spermwhale meal | | 30 | |
| Finback meal | 15 | | |
| Active sludge | 3 | 7 | |
| Leavens | 4 | | |
| Soya bean protein | 12 | | |
| Gluten | 3 | 10 | |
| Additives: | | | |
| Vitamin mixture | 5 | 5 | |
| Others [1] | 14 | 7 | |
| Coloring agent | 1 | 1 | |
| Fresh short-necked clams | | | 100 |
| Total | 100 | 100 | 100 |

[1] Mixture of salts and binding agent.

TABLE 8
Results of rearing

| | Present feed | Reference feed | |
|---|---|---|---|
| | | Compounded feed | Fresh clams |
| At the start of rearing: | | | |
| No. of prawns | 13,500 | 13,100 | 12,400 |
| Average body weight (g.) | 1.22 | 1.23 | 1.24 |
| After two month rearing: | | | |
| No. of prawns | 13,120 | 10,430 | 11,600 |
| Average body weight (g.) | 6.83 | 5.11 | 6.36 |
| Increase in body weight (times) | 5.59 | 4.15 | 5.12 |
| Ratio of feed intake [1] (percent) | 2.35 | 2.47 | 2.36 |
| Feed efficiency (percent) | 97.84 | 75.75 | 93.50 |

[1] Ratio of feed intake = (Total weight of feed intake) ×100 (%)

$$\frac{\text{Total weight of prawns at the start of rearing} + \text{Total weight of prawns after rearing} + \text{Total weight of dead prawns in rearing}}{2} \times \text{rearing days}$$

NOTE.—Volume of concrete culturing tank: 200 t (water depth: 2 m). Culturing period: 2 months.

As is clear from the results of rearing, the compounded feed in which the total conjugated amino acid content and the amino acid balance were adjusted according to the present invention shows a superior feed efficiency to that of fresh short-necked clams which have been the best feed among fresh fishes, shellfishes and conventional compounded feeds, while the feed which total conjugated amino acid content and amino acid balance deviate from the ranges disclosed by this invention shows a lower feed efficiency.

EXPERIMENTAL EXAMPLE 4

(Effects of active sludge as vitamins)

Generally, commercially available vitamin products are incorporated into animal feeds in a very small amount to fortify the feeds, however, the use of such products makes the cost of feed high since such vitamin products are extremely expensive. As a result of various experiments, the present inventors have found that active sludge has a good effect as a vitamin source on prawns.

The comparative experiment was conducted by using feed compositions prepared by adding a given amount of a commercially available vitamin product or a given amount of active sludge to a given amount of the basic composition comprising 50 parts by weight of squid meal, 20 parts by weight of petroleum yeasts and 5 parts by weight of a mixture of salts and admixing a binding agent composed of 1:4 mixture of α-starch and gluten so as to become 100 parts by weight in total, and the results of culturing are shown Table 9.

TABLE 9

| Commercially available vitamins: | Feed efficiency (percent) |
|---|---|
| Addition of 5 parts by weight | 90.0 |
| Active sludge: | |
| Addition of 7.5 parts by weight | 86.0 |
| Addition of 15 parts by weight | 88.0 |

It is more convenient to use active sludge with admixing commercially available vitamin products.

As stated previously, active sludge may be used as a main compounding element as it works well as vitamin source on prawns.

As is clear from the above-mentioned Experimental Examples 1–4, it is essential to contain in an end product at least 60% by weight of crude protein and/or at least 46% by weight of conjugated amino acids.

Especially, considering to utilize various kinds of protein-containing products from many fields, it should be reiterated that the end product should contain 46–50% by weight of conjugated amino acids and that said conjugated amino acid-constituting aspartic acid, threonine, serine, valine, phenylalanine, lysine, histidine and arginine should be in the range of 10.6–12.0%, 4.3–5.7%, 3.8–5.4%, 4.0–5.4%, 3.9–5.5%, 6.7–9.1%, 1.5–2.5% and 6.1–8.1%, respectively in their quantitative ratios to the total conjugated amino acid content.

In the case of preparing the present compounded feed not based on the amino acid balance, but based on the content of crude protein and/or the content of conjugated amino acids, the compounding ratio of main compounding elements is relatively restricted and at least 30% or more by weight of squid meal should be used. A preferable compound ratio of main compounding elements to the weight of the end product are 70–30% by weight of squid meal, 5–30% by weight of petroleum yeasts and/or marine yeasts, 3–15% by weight of active sludge and 5–20% by weight of mysid shrimp meal. In the case of preparing the present feed based on the amino acid balance, any ordinary protein-containing material may be used in range that the above-mentioned requirements can be fulfilled, and the compounding ratio of main compounding elements is determined by the amino acid balance. In this case, animal protein such as squid, whale meat, fish meat, mysid shrimps, brine shrimps, dry powders thereof and the like, vegetable protein such as soya bean protein, gluten and the like, cells of microorganisms such as yeasts, protein isolated from cells and the like, and active sludge can be cited as main compounding elements. As stated above, the amounts of respective main compounding elements are determined by the total conjugated amino acid content and the amino acid balance of eight amino acids among 18 ones including ammonia constituting conjugated amino acids. Preferably, the total amount of main compounding elements is 80–86% by weight in the end product.

The content of conjugated amino acid is preferably 46–60% by weight in the end product, however, it may exceed 60%.

The qualitative ratio of eight amino acids among constituents of conjugated amino acids, namely, aspartic acid, threonine, serine, valine, phenylalanine, lysine, histidine and arginine, to the total conjugated amino acid content, that is, the distribution ratios of eight amino acids are 10.6–12.0%, 4.3–5.7%, 3.8–5.4%, 4.0–5.4%, 3.9–5.5%, 6.7–9.1%, 1.5–2.5% and 6.1–8.1%, respectively and the respective distribution ratios must fall within the above-mentioned range at the same time.

Usually, the present compounded feed may be prepared by admixing a mixture of main compounding elements with vitamins, a mixture of inorganic salts, binding agents, coloring agents, medicaments and the like.

Any commercially available vitamins for fishes may be used as vitamins, however, vitamin preparations based on Halver composition is preferable. In case where active sludge is employed as a compounding element, it is not always necessary to add commercial vitamin preparations thereto.

A mixture consisting of sodium, potassium and calcium phosphates and calcium acetate or calcium lactate and having a calcium/phosphate ratio of 2–3 to 1 is usually employed as a mixture of inorganic salts. An illustrative example of the mixture is that composed of 47.6 parts by weight of potassium phosphate dibasic, 190.4 parts by weight of sodium phosphate monobasic, 95.3 parts by weight of calcium phosphate tribasic and 666.7 parts by weight of calcium lactate.

α-Starch, gluten, carboxymethylcellulose, sodium alginate, Nikasol (trademark of Nippon Carbide Co., Ltd.) and the like may be used as a binding agent. Preferably, α-starch, gluten or a mixture thereof is employed. In case where gluten is used as a main compounding element, no binding agent is needed, but if gluten is used as a binding agent, a keen caution should be paid to adjust the total conjugated amino acid content and the amino acid balance.

As illustrative examples of coloring agents, any commercially available carotenoid such as, for example, β-carotene, canthaxanthine, or the like is given. Some kinds of mysid shrimps may serve as a coloring agent since they contain a considerable amount of carotenoids.

As a medicament, various kinds of medicaments for fishes may be cited and one example is a furan derivative which has growth-promoting effect and sold by the name of "N.F. 180."

The ratio of the total amount of these additives to the amount of an end product is preferably 20–14% by weight and the amounts of respective additives may vary within the range of 20–14%. In view of easiness of intake by prawns, it is preferable to mold the present compounded feed into a cylindrical or a square pillar-like shape, and it is convenient to prepare the present feed in a powdery form and mold it into the above-mentioned shape just before feeding from the economical viewpoints; for cylindrical or square pillar-like feed is apt to become powder during transportation.

The present compounded feed has advantages that the cost of feeds can be reduced because of its high feed efficiency and reductions of the labours for preparing feeds and costs for storing fresh fishes and shellfishes, and the various kinds of protein-containing products may be used as main compounding elements in the present compounded feed while those for conventional feed are extremely restricted.

Thus, the remarkable improvements in culture technique which remain on an extensive level can be expected.

The following examples will further illustrate the present invention but the present invention is not limited to those set forth in the examples.

EXAMPLE 1

A feed for prawns according to this invention was prepared by molding the mixture of materials shown in Table 10 into a cylindrical shape in a conventional manner. The rearing was conducted in a concrete water tank (9 m. x 5 m. x 2.5 m.; capacity: 100 ton) which interior bottom was covered with fine sand, using hatchery-produced prawns having average weight of about 2 g. Seawater was flowing into said tank by pumping up constantly. The feed was given once a day and the culture period was 60 days. The water temperature was kept at 23° to 26° C. The rearing results are shown in Table 11.

TABLE 10

Composition of feeds

| Material | Present feed | Reference feed |
|---|---|---|
| Squid meal | 38 | |
| Petroleum yeasts | 20 | |
| Marine yeasts | 7.5 | |
| Mysid shrimp meal | 10 | |
| Active sludge | 7.5 | |
| Binding agent [1] | 12 | |
| Mixture of salts [2] | 5 | |
| Fresh fishes and shellfishes [3] | | 100 |

[1] 1:4 mixture of α-starch and gluten.
[2] A mixture of 47.6 parts by weight of potassium phosphate dibasic, 190.4 parts by weight of sodium phosphate monobasic, 95.3 parts by weight of calcium phosphate tribasic and 666.7 parts by weight of calcium lactate.
[3] A fresh short-necked clam, mussel, small red shrimp, small fishes and the like were employed.

TABLE 11

Rearing results

| | Present feed | Reference feed |
|---|---|---|
| At the start of rearing: | | |
| No. of prawns | 10,000 | 10,000 |
| Average body weight of prawns (g.) | 2.30 | 2.10 |
| After 60 days rearing: | | |
| No. of prawns | 9,850 | 9,900 |
| Average body weight of prawns (g.) | 5.59 | 4.62 |
| Increase in body weight (times) | 2.43 | 2.20 |
| Feed efficiency | 82.64 | 68.34 |

As is clear from the results shown in Table 11, the feed efficiency of the present feed was superior to that of the reference feed, while, as shown in Table 12, the cost of the present feed is ⅓ of that of fresh short-necked clams which is considered to be the best feed for culturing the prawns.

Table 12

| | Price (yen/kg.) |
|---|---|
| Present feed | 383 |
| Reference feed | a 1,300 | a The cost of the reference feed was calculated on the basis of the price of dried shucked short-necked clams.

EXAMPLE 2

38 parts by weight of squid meal, 20 parts by weight of petroleum yeast, 7.5 parts by weight of marine yeast, 7.5 parts by weight of active sludge, 10 parts by weight of euphausia meal, 5 parts by weight of vitamin mixture (Halver composition), 5 parts by weight of a mixture of salts, 2 parts by weight of α-starch and 5 parts by weight of gluten were mixed well, and to the resultant mixture, was added 35 parts by weight of water. The resultant was pressed out through small holes of a plate while keeping the temperature of molding machine at 40° C. and dried to obtain cylindrical feeds having a diameter of 1.5 mm. and a length of 10 to 15 mm.

EXAMPLE 3

A powder feed was obtained by mixing well 53 parts by weight of squid meal, 10 parts by weight of euphausia, 20 parts by weight of petroleum yeast, 5 parts by weight of active sludge, 5 parts by weight of a mixture of salts, 2 parts by weight of $\alpha$-starch and 5 parts by weight of vitamin mixture (Halver composition).

EXAMPLE 4

Squid meal, mysid shrimp meal, active sludge, finback meal, commercially available yeasts for compounded feeds, soya bean protein and gluten were employed as main compounding elements. The amounts of respective compounding elements were calculated based on the data shown in Tables 5 and 6 so as to contain around 46% by weight of the total conjugated amino acids and to meet the requirements of the amino acid balance. Based on the results, 32.6% by weight of squid meal, 11.2% by weight of mysid shrimp meal, 5.5% by weight of active sludge, 5.4% by weight of fish meal, 10.6% by weight of finback meal, 5.2% by weight of commercially available yeasts for compounded feeds, 7.7% by weight of soya bean protein and 3.1% by weight of gluten were mixed thoroughly. To the resultant, were added 3.7% by weight of chitin, 3.0% by weight of Halver-composition vitamins which is fortified by adding 25% of cholesterol and 10% of vitamin C to it, 11.9% by weight of a mixture of salts which comprises 100 parts by weight of potassium phosphate dibasic, 150 parts by weight of calcium phosphate tribasic and 750 parts by weight of calcium lactate and 0.1% by weight of Carophyl red (a trademark for a product containing canthaxanthin as main component and sold by Takeda Chemical Industries Co., Ltd.). Since the resultant contained 46.5% by weight of conjugated amino acids and the respective distribution ratios of aspartic acid, threonine, serine, valine, phenylalanine, lysine, histidine and arginine were 11.4%, 5.0%, 4.8%, 4.8%, 5.3%, 7.8%, 2.2% and 6.8%, the feed met clearly the requirements according to the present invention. To the resulting mixture, was added water to mold the feed into a cylindrical shape. About 12,000 of prawns were reared in a 200 ton concrete water tank (water depth: 2 m.) for two months by giving the feed once a day. The water temperature was kept at 23° to 26° C. The rearing results are shown in Table 13 below.

TABLE 13

Rearing results

At the start of rearing:
    No. of prawns _____ 12,100
    Average body weight (g.) _____ 1.26
After 2 month rearing:
    No. of prawns _____ 11,080
    Average body weight( g.) _____ 7.47
Increase in body weight (times) _____ 5.92
Feed intake ratio (percent) _____ 2.19
Feed efficiency (percent) _____ 106.32

As is clear from the results shown in Table 13 above, the feed efficiency of the present feed is very high.

EXAMPLE 5

As main compounding elements, squid meal, mysid shrimp meal, fish meal, finback meal, soya bean protein and gluten were employed. The distribution ratios of eight amino acids were calculated in the same manner as in Example 4 so as to contain about 55% by weight of conjugated amino acids. As a result, 46.8% by weight of squid meal, 5.6% by weight of mysid shrimp meal, 7.6% by weight of fish meal, 15.9% by weight of finback meal, 5.5% by weight of soya bean protein and 3.1% by weight of gluten were mixed thoroughly to obtain and end feed composition which contained 55.6% by weight of conjugated amino acids and which distribution ratios of aspartic acid, threonine, serine, valine, phenylalanine, lysine, histidine and arginine were 11.3%, 5.0%, 4.7%, 4.6%, 5.3%, 7.9%, 2.2% and 6.8%, respectively. Thus, the amino acid balance of the feed was in the range according to this invention. To the mixture, were added vitamins, the mixture of salts and the coloring agent employed in Example 4 and the amounts thereof were 3.0, 12.4 and 0.1 parts by weight, respectively. The resultant was molded into a cylindrical shape and dried as shown in Example 4.

About 12,000 of prawns were cultured in a concrete 200 ton water tank (water depth: 2 m.) for 2 months by giving the above-mentioned feed once a day. The water temperature was kept at 25° to 28° C. The culturing results are shown in Table 14 below.

TABLE 14

Rearing results

At the start of rearing:
    No. of prawns _____ 11,800
    Average body weight (g.) _____ 1.25
After 2 month rearing:
    No. of prawns _____ 11,250
    Average body weight (g.) _____ 7.02
Increase of body weight (times) _____ 5.61
Feed intake ratio (percent) _____ 2.30
Feed efficiency (percent) _____ 99.71

As is clear from the culturing results shown in Table 14 above, the feed composition according to the present invention shows a stable high feed efficiency.

EXAMPLE 6

As main compounding elements, squid meal, mysid shrimp meal, petroleum yeast and finback meal were employed. The distribution ratios of eight amino acids were calculated in the same manner as in Example 4 so as to contain about 60% by weight of conjugated amino acids. As a result, 60% by weight of squid meal, 5% by weight of euphausia, 15% by weight of petroleum yeast and 5% by weight of finback meal were mixed thoroughly to obtain an end product which contained 59.3% by weight of conjugated amino acids, and which distribution ratios of aspartic acid, threonine, serine, valine, phenylalanine, lysine, histidine and arginine were 11.8%, 5.1%, 4.8%, 4.8%, 5.4%, 8.2%, 2.2% and 6.9%, respectively. The above-mentioned distribution ratios were in the range of the amino acid balance according to the present invention.

To the resulting mixture, were added vitamins, the mixture of salts and the coloring agent employed in Example 4 and the respective amounts were 4.9, 10.0 and 0.1 parts by weight so as to become 100 parts by weight in total. The resultant was molded into a cylindrical shape and dried as shown in Example 4.

The results of rearing prawns having the average weight of 1.25 g. are shown in Table 15 below. Thhe method of the culture was the same as that of Example 4. The water temperature was 25° to 28° C.

TABLE 15

Rearing results

At the start or rearing:
    No of prawns _____ 12,000
    Average body weight (g.) _____ 1.25
After 2 month rearing:
    No. of prawns _____ 11,300
    Average body weight (g.) _____ 7.15
Increase of body weight (times) _____ 5.72
Feed intake ratio (percent) _____ 2.25
Feed efficiency (percent) _____ 102.31

As is clear from the instant example, the compounded feed composition shows extremely predominant feed efficiency.

What is claimed is:

1. A feed composition for prawns comprising at least two main compounding elements selected from the group consisting of animal products, botanical products and cells of microorganisms, wherein the content of crude protein in the composition is at least 60% by weight and the content of conjugated amino acids consisting of aspartic acid, threonine, serine, glutamic acid, proline, glycine, alanine, cystine, valine, methionine, isoleucine, leucine, tyrocine, phenylalanine, lysine, histidine and arginine is at least 46% by weight and the quantitative ratios of the respective contents of aspartic acid, threonine, serine, valine, phenylalanine, lysine, histidine and arginine to the total conjugated amino acid content are 10.6–12.0%, 4.3–5.7%, 3.8–5.4%, 4.0–5.4%, 3.9–5.5%, 6.7–9.1%, 1.5–2.5% and 6.1–8.1% and wherein the compounding elements are (1) squid meal, (2) yeasts selected from the group consisting of petroleum yeast and marine yeast, (3) active sludge, and (4) mysid shrimps in the range of 70–30%, 5–30%, 3–15%, and 5–20% by weight of the composition, respectively.

2. A method for culturing prawns by feeding said prawns the compositions as defined in claim 1.

References Cited

UNITED STATES PATENTS

| | | | |
|---|---|---|---|
| 3,620,754 | 11/1971 | Kanemitsu et al. | 99—3 |
| 3,671,261 | 6/1972 | Ayukawa et al. | 99—3 |
| 3,591,389 | 7/1971 | Schneider | 99—3 |
| 2,566,549 | 9/1951 | Beckwith et al. | 99—18 |
| 3,170,794 | 2/1965 | Jeffreys et al. | 99—18 |
| 2,077,533 | 4/1937 | Schmalfuss et al. | 99—7 |

OTHER REFERENCES

*Fish Protein Concentrate*, Library of Congress, 1970 Abstracts: 9 (pp. 3–4); 200 (p. 43); 244 (pp. 53–54).

NORMAN YUDKOFF, Primary Examiner

C. P. RIBANDO, Assistant Examiner

U.S. Cl. X.R.

119—2; 426—62, 212